(No Model.)
J. C. TUNNICLIFF.
CORN PLANTER SPLIT WHEEL.
No. 506,750. Patented Oct. 17, 1893.
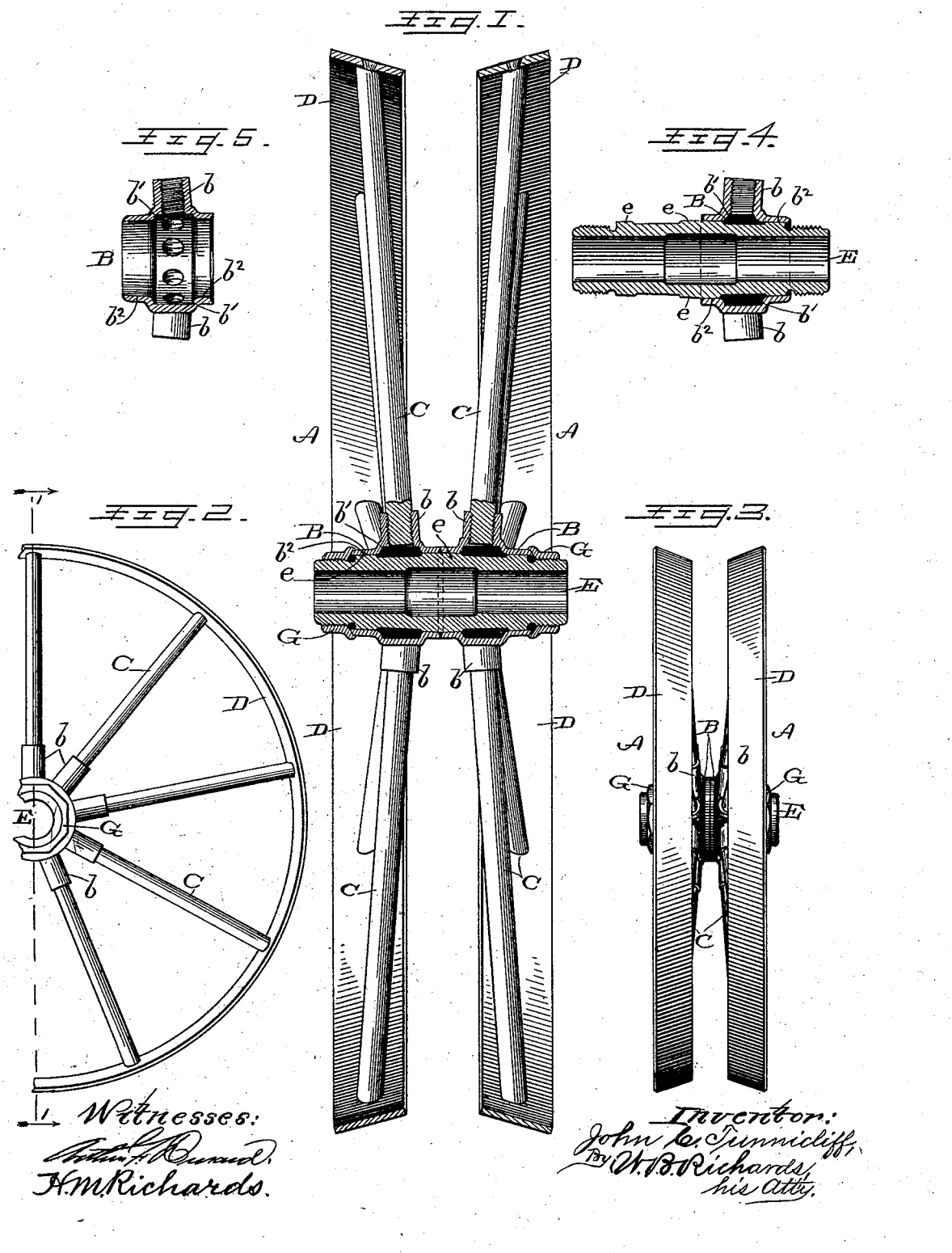

UNITED STATES PATENT OFFICE.

JOHN C. TUNNICLIFF, OF GALESBURG, ASSIGNOR TO THE H. H. PERKINS MANUFACTURING COMPANY, OF KEWANEE, ILLINOIS.

CORN-PLANTER SPLIT WHEEL.

SPECIFICATION forming part of Letters Patent No. 506,750, dated October 17, 1893.

Application filed January 6, 1893. Serial No. 457,462. (No model.)

*To all whom it may concern:*

Be it known that I, JOHN C. TUNNICLIFF, a citizen of the United States, residing at Galesburg, in the county of Knox and State of Illinois, have invented certain new and useful Improvements in Corn-Planter Split Wheels, of which the following is a specification.

The corn planter wheel to which the invention that is herein described pertains, is of that type having a split rim, or rim in two parts, each part of which is supported on spokes independent of the supporting spokes of the other part, and this invention has for its object the production of an efficient wheel of the class referred to, which while constructed in such manner as to provide for readily removing its separate parts from the hub for repairs or for other purposes, will also be structurally strong and durable, economic of manufacture, and efficient for the purposes intended in operation.

With these ends in view my present invention consists in constructions and organization of parts to produce a composite structure or wheel, as hereinafter fully described, and as expressed in the claims forming a part of this specification.

The preferred construction of parts and their organization in a wheel, are illustrated in the accompanying drawings, in which—

Figure 1 is an axial sectional elevation of my improved wheel; Fig. 2, a side elevation of part of the wheel; Fig. 3, an edge elevation of the wheel; Fig. 4, a central sectional elevation of the hub, and one of the spoke seating sleeves; Fig. 5, a central sectional elevation of one of the spoke seating sleeves alone.

The wheel aside from the hub is in two parts A, A, each of which comprises in its structure a sleeve B with projecting screw threaded bosses $b$ into which the inner screw threaded ends of the spokes C are screwed, and a rim D, fixed to the spokes C as shown or in any other ordinary or preferred manner. Each rim D may be cylindrical, or at right angles with its plane of revolution, but I prefer them, as shown, frusto conical in form. The sleeves B each have an annular depression $b'$ in its inner surface, which permits screwing the spokes more or less into the bosses $b$, and also leaves annular bearing surfaces $b^2$ for purposes hereinafter described.

The hub E in its interior is of ordinary form, and preferably has enlarged annular exterior parts $e$ which form bearings for the inner end parts or annular bearings $b^2$ of the sleeves B, as shown at Figs. 1 and 4. The bearing surfaces on the interiors of the sleeves B fit closely and tightly on the bearing surfaces of the hub, so that two of the parts A can be placed on one hub, as shown best at Fig. 1, and when so placed can be fixed or locked against movement on the hub by means of nuts G, one of which screws onto each end of the hub E, and each of which is slightly enlarged at its end next the adjacent end of a sleeve B, so as to fit slightly thereover and exclude dust, while at the same time abutting thereagainst, that the nuts may force the sleeves B into close contact.

The parts A are placed on the hub E in such manner that the rims of the two parts are at a distance apart about equal to the width of one of said rims, and in such manner that the outer surfaces of the rims incline inwardly toward each other to press the soil in a row of deposited seed into a ridge like form, the central part or line of which ridge, or part immediately over the deposited seed, is left unpressed by the interspace between the wheel rims, while the sides of the ridge are pressed inwardly as well as downwardly to compact the soil over and adjacent to the deposited hills or quantities of seed.

The parts A are the same structurally, and are interchangeable in an evident manner. The means shown and described provide a split wheel which is more than ordinarily strong, which is practical to manufacture, which is efficient in operation, and the parts A being interchangeable are also substitutive, so that one part becoming damaged, another may be readily and easily substituted therefor.

Having thus described my invention, what I claim as new, and desire to secure by Letters Patent, is—

1. A corn planter split wheel, comprising in its composite structure, two separable parts A, each part formed of a rim D, spokes C, and sleeve B, to which sleeve the inner ends of the spokes are secured; a hub E on which said sleeves are mounted; and nuts G for securing the sleeves in place, and thereby the parts A in place on the hub, substantially as described.

2. A corn planter split wheel, comprising in its composite structure, two separable parts A, each formed of a rim D, spokes C, and a sleeve B having bosses $b$ to which the inner ends of the spokes are secured; a hub E on which the two parts are mounted; and nuts G screwed one onto each end of the hub and each provided with a part overlapping and abutting the adjacent end of a sleeve, substantially as described.

3. A corn planter split wheel, comprising in its composite structure, two separable parts A, each formed of a rim D, spokes C, and a sleeve B, having screw threaded bosses $b$ for securing the inner ends of the spokes, and each having bearing surfaces $b^2$, a hub E on which the two parts A are mounted, provided with exterior bearing surfaces $e$, and nuts G, having inner ends which are adapted to cover the end of the sleeve adjacent to each nut and to abut thereagainst, substantially as described.

In testimony whereof I affix my signature in presence of two witnesses.

JOHN C. TUNNICLIFF.

Witnesses:
J. K. MITCHELL,
LAKE W. SANBORN.